US011396476B2

(12) United States Patent
Terruzzi et al.

(10) Patent No.: US 11,396,476 B2
(45) Date of Patent: Jul. 26, 2022

(54) OPTICAL FIBRE COATED WITH A POLYESTER COATING

(71) Applicants: PRYSMIAN S.p.A., Milan (IT); POLITECNICO DI MILANO, Milan (IT)

(72) Inventors: Lidia Terruzzi, Milan (IT); Pamela De Martino, Milan (IT); Attilio Citterio, Milan (IT); Massimo Gola, Milan (IT)

(73) Assignees: PRYSMIAN S.p.A., Milan (IT); POLITECNICO DI MILANO, Milan (IT)

( * ) Notice: Subject to any disclaimer, the term of this patent is extended or adjusted under 35 U.S.C. 154(b) by 689 days.

(21) Appl. No.: 16/318,282

(22) PCT Filed: Jul. 22, 2016

(86) PCT No.: PCT/IB2016/054380
§ 371 (c)(1),
(2) Date: Jan. 16, 2019

(87) PCT Pub. No.: WO2018/015790
PCT Pub. Date: Jan. 25, 2018

(65) Prior Publication Data
US 2019/0233330 A1 Aug. 1, 2019

(51) Int. Cl.
*C03C 25/323* (2018.01)
*C03C 25/50* (2006.01)
*C08G 63/00* (2006.01)
*C09D 167/08* (2006.01)
*C09D 167/00* (2006.01)
*G02B 6/02* (2006.01)
*G02B 6/10* (2006.01)

(52) U.S. Cl.
CPC ............ *C03C 25/323* (2013.01); *C03C 25/50* (2013.01); *C08G 63/00* (2013.01); *C09D 167/00* (2013.01); *C09D 167/08* (2013.01); *G02B 6/02395* (2013.01); *G02B 6/10* (2013.01)

(58) Field of Classification Search
None
See application file for complete search history.

(56) References Cited

U.S. PATENT DOCUMENTS

| 2,552,872 | A | | 5/1951 | Shechter |
| 3,066,383 | A | | 12/1962 | Marzocchi et al. |
| 4,081,411 | A | | 3/1978 | Hunsucker |
| 4,778,245 | A | | 10/1988 | Ueno et al. |
| 5,146,531 | A | * | 9/1992 | Shustack ............... C03C 25/106 385/128 |
| 8,426,021 | B2 | * | 4/2013 | Cattron ................ C08G 18/672 428/392 |
| 2002/0132118 | A1 | * | 9/2002 | Hirai .................... C09D 175/16 428/375 |
| 2002/0151615 | A1 | | 10/2002 | Tortorello et al. |
| 2002/0168164 | A1 | | 11/2002 | Bishop et al. |
| 2003/0059618 | A1 | * | 3/2003 | Takai .................... C07D 303/22 428/413 |
| 2005/0161634 | A1 | | 7/2005 | Szum et al. |
| 2007/0246263 | A1 | | 10/2007 | Reitsma |
| 2012/0203026 | A1 | | 8/2012 | Kawakami et al. |
| 2017/0267876 | A1 | | 9/2017 | Corten et al. |
| 2021/0094875 | A1 | * | 4/2021 | Terruzzi ............... C09D 133/08 |

FOREIGN PATENT DOCUMENTS

| CA | 459839 A | 9/1949 |
| CH | 358063 | 11/1961 |
| CN | 1225660 A | 8/1999 |
| CN | 1314923 A | 9/2001 |
| CN | 101090935 A | 12/2007 |
| CN | 101809047 A | 8/2010 |
| CN | 102439101 A | 5/2012 |
| CN | 106574142 A | 4/2017 |
| EP | 1 898 044 | 3/2008 |
| GB | 560095 A | 3/1944 |

(Continued)

OTHER PUBLICATIONS

International Search Report and Written Opinion dated Dec. 19, 2016 in PCT/IB2016/054380, 16 pages.
Office Action dated Dec. 31, 2019 in co-pending U.S. Appl. No. 16/330,589, 11 pages.
Ellen Hornung, et al., "Formation of Conjugated $\Delta^{11}$ $\Delta^{13}$-Double Bonds by 12-Linoleic Acid (1,4)-Acyl-Lipid-Desaturase in Pomegranate Seeds" European Journal of Biochemistry, vol. 269, 2002, pp. 4852-4859.
"Fatty Acid" Wikipedia, Dec. 18, 2019, 7 pages.
Combined Chinese Office Action and Search Report dated May 8, 2021 in Chinese Patent Application No. 201680087812.1 (with English translation), 11 pages.
Edgar B. Cahoon et al., "Formation of Conjugated $\Delta^8,\Delta^{10}$-Double Bonds by $\Delta^{12}$-Oleic-acid Desaturase-related Enzymes", The Journal of Biological Chemistry, vol. 276, No. 4, 2001, pp. 2637-2643.
Office Action dated Jul. 15, 2020 in co-pending U.S. Appl. No. 16/330,589, 14 pages.

(Continued)

*Primary Examiner* — Eric Wong
(74) *Attorney, Agent, or Firm* — Oblon, McClelland, Maier & Neustadt, L.L.P.

(57) ABSTRACT

The present invention concerns an optical fibre comprising: an optical waveguide comprising a glass core surrounded by a glass cladding; a coating surrounding said optical waveguide comprising a cured polymer material comprising a polyester obtained by esterification of: a reactant A selected from an acid, a triglyceride, or a mixture of triglycerides having a $C_{16}$-$C_{24}$ aliphatic chain comprising at least two conjugated double bonds; and a polyol made of at least one monomer comprising at least 3 hydroxyl groups, the polyol being thermally stable up to 300° C. (reactant B). The present invention concerns also the above said polyester coating, a method for coating an optical fibre with said polyester coating and a method for obtaining predetermined mechanical properties of a coating for an optical fibre. The cured polymer forming the coating can be prepared by curing the polyester of the invention either thermally or by radiation.

16 Claims, No Drawings

(56) References Cited

FOREIGN PATENT DOCUMENTS

| JP | 59-197477 A | 11/1984 |
|----|----|----|
| WO | WO 00/02943 A1 | 1/2000 |
| WO | WO 2004/087855 A1 | 10/2004 |
| WO | WO 2009/143409 | 11/2009 |
| WO | WO 2012/100259 | 7/2012 |
| WO | WO 2015/047418 | 4/2015 |

OTHER PUBLICATIONS

"Carboxylic acid," New World Encyclopedia, Jul. 7, 2014, 8 pages.
International Search Report dated Dec. 15, 2016, in PCT/IB2016/055389 filed Sep. 9, 2016.
Office Action dated Dec. 14, 2020, in co-pending U.S. Appl. No. 16/330,589, filed Mar. 5, 2019.
Wikipedia article, "Tung Oil", (2015).
International Search Report dated Jan. 4, 2018 in PCT/IB2017/056527 filed Oct. 20, 2017.
Office Action dated Mar. 22, 2021 in co-pending U.S. Appl. No. 16/330,589, 21 pages.
International Search Report and Written Opinion dated Oct. 1, 2018 in PCT/IB2018/050345, 11 pages.
Combined Chinese Office Action and Search Report dated Feb. 14, 2022 in Patent Application No. 201880086988.4 (with English language translation), 10 pages.

\* cited by examiner

OPTICAL FIBRE COATED WITH A POLYESTER COATING

FIELD OF THE INVENTION

The present invention relates to an optical fibre coated with a polyester coating. The polyester coating can be either radiation cured or, more advantageously, thermally cured. The optical fibre of the present invention is a valuable alternative to the optical fibres coated with conventional polymeric materials that need to be cured by means of radiation at controlled temperature, such as UV-curable acrylate polymer materials.

BACKGROUND OF THE INVENTION

Optical fibres commonly comprise a glass core, inside which the transmitted optical signal is confined, surrounded by a cladding (typically with a diameter of about 120-130 µm), preferably made of glass. The combination of core and cladding is usually identified as "optical waveguide". The optical waveguide is generally protected by a coating, typically of polymeric material, which protects the fibre glass from the external environment and provides resistance to physical handling forces, such as those encountered when the fibre is subjected to cabling operations. The coating typically comprises a first coating layer positioned in direct contact with the cladding, also known as the "primary coating", and at least one second coating layer, also known as "secondary coating", surrounding the first coating. In the art, the combination of primary coating and secondary coating is sometimes also identified as "primary coating system", as both these layer are generally applied during the drawing manufacturing process of the fibre. In this case, the coating in contact with the cladding is called "inner primary coating" while the coating in contact with and surrounding the inner primary coating is called "outer primary coating". In some instance, a single coating can be applied in contact with the cladding. Thereafter, the term "primary coating" shall designate the inner primary coating and the term "secondary coating" shall designate the outer primary coating.

Generally, the primary coating is made of a relatively soft material having a relatively low modulus of elasticity E' at room temperature (typically of from 0.1 MPa to 5 MPa) and a low Tg, for example lower than −20° C. The secondary coating is generally formed by a more rigid polymer having a higher modulus of elasticity E' at room temperature (typically of from 500 MPa to 2000 MPa) and a higher glass transition temperature (Tg) compared to those of the primary coating layer.

For certain applications, optical waveguide may be coated with a single coating layer having modulus of elasticity and Tg values which are intermediate between those of the primary coating and the secondary coating. The overall diameter of the optical waveguide with the primary and secondary coating can be of from 150 to 250 µm.

The polymer materials generally used to form primary coatings, secondary coatings and single layer coatings are obtained from compositions comprising acrylate oligomers and monomers that are crosslinked by means of UV radiation in the presence of a suitable photoinitiator. The acrylate polymer coatings, however, should be formed on the optical waveguide at relatively low temperatures, e.g. from ambient temperature to about 50° C., and cured in the presence of an inert atmosphere (e.g. under nitrogen gas) in order to avoid the thermal degradation of the polymer materials and guarantee the proper adhesion of the coating layer to the optical waveguide. These constraints require the use of special apparatuses for controlling the temperature during the polymer deposition and curing process. Typically, radiation curing ovens are continuously flushed with inert gases (e.g. nitrogen or helium) in order to maintain the required conditions.

The need for the above-described stringent operating conditions, apparently, make the manufacturing process of the optical fibres and the apparatus used for carrying out the process thereof rather complex and costly.

SUMMARY OF THE INVENTION

The Applicant has faced the problem of providing a polymer material suitable for forming coating layers on optical fibres that can be cured at a relatively high temperature, either thermally or by radiation, in order to simplify the manufacturing process of coated optical waveguide.

In particular, the Applicant has faced the problem of providing a polymer material suitable for forming coating layers on optical waveguides which is thermocurable, so that it could be applied to the optical waveguide without using radiation devices, such as UV ovens, which require precise temperature control and the presence of inert gas.

The Applicant has found that the above problems and others that will appear more clearly from the following description can be solved by polymer materials which contain certain polyesters as oligomer units that can be cured either by heat or radiation at temperatures up to 300° C.

When cured by heat, the polymer material of the present invention has the advantage of being applicable during the drawing process of the fibre before the drawn fibre is cooled down close to room temperature, and of exploiting the heat of the just drawn glass fibre as heat source for curing.

When cured by radiation, the polymer material of the present invention has the advantage of allowing the use of less controlled operating conditions, particularly during the curing step, because these polymers have less sensitivity to thermal degradation even when cured in the presence of oxygen.

The cured polymer materials of the present invention have mechanical properties, in particular elasticity and adhesion to the glass surface of the fibre, which make the coated optical fibre suitable for use over a wide range of temperature (e.g. from −60° C. to +150° C.). The coating polymer materials of the present invention can be used as primary, secondary or single coating, preferably as primary and single coatings of optical fibres.

According to the present invention the polyester of the invention can be obtained by an esterification reaction between a selected long-chained unsaturated residue and a selected polyol. By changing the relative ratios of these reactants, polymer materials having the desired mechanical properties can be obtained. The properties of the final polymer can also be adjusted by selecting appropriate curing temperatures and curing times, which influences the cross-linking density of the polymer.

According to a first aspect, therefore, the present invention relates to an optical fibre comprising:
- an optical waveguide comprising a glass core surrounded by a glass cladding;
- a coating surrounding said optical waveguide comprising a cured polymer material comprising a polyester obtained by esterification of: a reactant A selected from an acid, a triglyceride, or a mixture of triglycerides having a $C_{16}$-$C_{24}$ aliphatic chain comprising at least two conjugated double bonds; and a polyol made of at least one monomer comprising at least 3 hydroxyl groups, the polyol being thermally stable up to 300° C. (reactant B).

According to a second aspect, the present invention relates to a method for coating an optical fibre comprising:
providing an optical waveguide comprising a glass core surrounded by glass a cladding;
applying a radiation curable coating composition on the cladding, said coating composition comprising a polyester obtained by esterification of a reactant A selected from an acid, a triglyceride, or a mixture of triglycerides having a $C_{16}$-$C_{24}$ aliphatic chain comprising at least two conjugated double bonds, and a polyol made of at least one monomer comprising at least 3 hydroxyl groups, the polyol being thermally stable up to 300° C. (reactant B), the esterification being carried out in the presence of a catalyst;
curing said radiation curable coating composition so as to crosslink said polyester and to form the coating.

According to a third aspect, the present invention relates to a polymer material comprising a polyester obtained by esterification of a reactant A selected from an acid, a triglyceride, or a mixture of triglycerides having a $C_{16}$-$C_{24}$ aliphatic chain comprising at least two conjugated double bonds, and a polyol made of at least one monomer comprising at least 3 hydroxyl groups, the polyol being thermally stable up to 300° C. (reactant B), the esterification being carried out in the presence of a catalyst.

Unlike the known acrylate based optical fibre coatings typically obtained by reacting a polyisocyanate, a (poly) alcohol, a (meth)acrylate monomer and a photoinitiator, often in the presence of viscosity adjusters and/or diluents and/or adhesion promoters, to give a urethane (meth)acrylate oligomer which is admixed at least with a reactive diluent to provide the optical fibre coating material, the optical fibre coating material of the present invention is based on just two classes of main components, reactants A and reactants B. The obtainment of an acrylate based optical fibre coating with mechanical properties suitable, for example, as primary coating implies considering a plethora of variables. On the contrary, the mechanical properties of the coating material of the present invention can be adjusted just by changing the ratios in a given couple reactant A/reactant B.

According to a fourth aspect, the present invention relates to a method for obtaining predetermined mechanical properties of a coating for an optical fibre, wherein the coating comprises a cured polymer material comprising a polyester obtained by esterification of:
a reactant A selected from an acid, a triglyceride, or a mixture of triglycerides having a $C_{16}$-$C_{24}$ aliphatic chain comprising at least two conjugated double bonds, and
a reactant B made of a polyol made of at least one monomer comprising at least 3 hydroxyl groups, the polyol being thermally stable up to 300° C.,
wherein the mechanical properties are adjusted by selecting a ratio between reactant A and reactant B.

Such a method allows obtaining a coating for optical fibre having mechanical properties suitable for use as primary coating, secondary coating or single coating, by selecting a certain amount of a reactant A, for example alfa-eleostearic acid, and a certain amount of a reactant B, for example a trimethylolpropane ethoxylate 450, and carrying out an esterification reaction. The resulting polyester is cured and its mechanical properties, for example modulus of elasticity E', glass transition temperature or both, are measured. In the event such properties do not fit for the coating sought or a coating with different mechanical properties is subsequently required, the ratio (proportion) reactant A/reactant B can be changed for obtaining a coating material with the sought mechanical properties.

For the purpose of the present description and of the appended claims, the words "a" or "an" are used to describe elements and components of the invention. This is done merely for convenience and to give a general sense of the invention. This description and claims should be read to include one or at least one and the singular also includes the plural unless it is obvious that it is meant otherwise.

For the purpose of the present description and of the appended claims, the values of modulus of elasticity E' and Tg are meant to be determined by means of Dynamic Mechanical Thermal Analysis (DMTA) in tension. Tg is derived from the DMTA curve obtained by on-set point method.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the claims that follow, as "thermally stable" is meant that a substance heated up to 300° C., at atmospheric pressure and in air, has a weight loss from 0 wt % to 2 wt % of its weight. The weight loss can be calculated for example by thermogravimetric analysis (TGA; 20° C./min).

DETAILED DESCRIPTION OF THE INVENTION

According to the invention, a suitable reactant A is an acid, a triglyceride, or a mixture of triglycerides having a $C_{16}$-$C_{24}$ aliphatic chain comprising at least two conjugated double bonds. The Applicant has observed that a reactant A lacking chains with at least two conjugated double bonds are unsuitable for the purpose of the present invention, as the polyester derived by its esterification with a polyol as the reactant B is either not sufficiently crosslinkable or is crosslinkable only after curing times too long for a convenient industrial application.

Preferably, the acid having a $C_{16}$-$C_{24}$ aliphatic chain comprising at least two conjugated double bonds as reactant A is a monocarboxylic acid.

For example, the acid having a $C_{16}$-$C_{24}$ aliphatic chain comprising at least two conjugated double bonds as reactant A is alpha-eleostearic acid (α-ESA; 9Z11E13E-18:3), calendic acid (8E10E12Z-18:3), punicic acid (9E11E13Z-18:3) or licanic acid (4-keto-octadeca-9,11,13-trienoic acid). Alpha-eleostearic acid is preferred.

In an embodiment of the invention, the reactant A is a triglyceride or a mixture of triglycerides comprising at least one $C_{16}$-$C_{24}$ aliphatic chain comprising at least two conjugated double bonds. Vegetable oils or seed oils can contain such triglycerides or mixture of triglycerides in an amount of from 30 wt % to 80 wt %.

Advantageously, the reactant A is a mixture of triglycerides containing at least 70% by weight, based on the total weight of said mixture, of at least one $C_{16}$-$C_{24}$ aliphatic chain comprising at least two conjugated double bonds. When the amount of $C_{16}$-$C_{24}$ aliphatic chains comprising at least two conjugated double bonds in an oil is lower than 70 wt %, known techniques can be applied to concentrate the polyunsaturated conjugated part, e.g. by fractional crystallization.

Mixture of triglycerides having the above amount of $C_{16}$-$C_{24}$ aliphatic chains comprising at least two conjugated double bonds are commercially available, e.g. as tung oil, pomegranate seed oil, calendula oil, and their mixtures.

The use of triglycerides as reactant A can be advantageous with respect to the use of an acid as such in that the first is economically profitable.

The reactant B, which is a polyol made of at least one monomer comprising at least 3 hydroxyl groups, the polyol being thermally stable up to 300° C., is preferably a polyol made of at least one monomer comprising from 3 to 9, more preferably from 3 to 6 hydroxyl groups.

The hydroxyl groups of the polyol monomer can be primary, secondary or tertiary hydroxyl groups, preferably primary or secondary hydroxyl groups, more preferably primary hydroxyl groups. Primary hydroxyl groups showed the highest reactivity among the three kinds of hydroxyl groups.

Examples of reactant B according to the invention are glycerol ethoxylate, glycerol propoxylate, trimethylolpropane ethoxylate, dipentaerythritol and mixtures thereof.

Preferably, the glycerol ethoxylate and glycerol propoxylate have an average number molecular weight (Mn) of from 800 to 1,200 (determined by GPC analysis).

Preferably, the trimethylolpropane ethoxylate has an average number molecular weight (Mn) of from 100 to 1,200.

Advantageously, the reactant B according to the invention is in liquid form at room temperature. The liquid form of the reactant B promotes the physical admixture with the reactant A and helps to obtain of a polyester with an homogeneous appearance.

The polyol as reactant B of the invention are thermally stable up to 300° C. The polyol as reactant B of the invention can be thermally stable even at temperatures over the given limit, but their stability within the above mentioned limit is to be present.

To prepare the polyesters of the invention, reactants A and B are reacted under esterification conditions.

Preferably, when reactant A is an acid with a $C_{16}$-$C_{24}$ aliphatic chain comprising at least two conjugated double bonds, the ratio between reactant A and reactant B is of one mole of reactant A per each hydroxyl group contained in the reactant B.

The number of hydroxyl group contained in reactant B can be ascertained by the hydroxyl value method providing the content of free hydroxyl groups in a chemical substance, usually expressed in units of the mass of potassium hydroxide (KOH) in milligrams equivalent to the hydroxyl content of one gram of the chemical substance. The method is based on the number of milligrams of potassium hydroxide required to neutralize the acetic acid taken up on acetylation of one gram of a chemical substance that contains free hydroxyl groups.

When reactant A is a triglyceride or a mixture of triglycerides having a $C_{16}$-$C_{24}$ aliphatic chain comprising at least two conjugated double bonds, the esterification between reactants A and B to prepare the polyesters of the invention is a transesterification reaction. The reaction conditions are substantially the same employed for the esterification reaction between reactants A and B, when the first is an acid as such.

Preferably, when reactant A is a triglyceride, or a mixture of triglycerides having a $C_{16}$-$C_{24}$ aliphatic chain comprising at least two conjugated double bonds, the reactant A is made to react with reactant B in a molar ratio A/B within the range from 1:1 to 1:3, wherein A is expressed as number of moles of triglycerides having at least one chain comprising at least two conjugated double bonds and B is expressed as number of moles of polyol.

Notably, by changing the quantities and relative ratios of the reactants A and B, polymer materials having the desired mechanical properties can be obtained.

The esterification reaction can be carried out using the techniques and the devices well known to the person skilled in the art. Preferably, the esterification reaction between the reactant A and the reactant B is carried out in the presence of a catalyst, such as an acid or a base, preferably a base, suitable for the esterification of acid or triglycerides with polyols. Examples of catalysts are: metal hydroxides, alkoxides and carbonates, alkaline tert-butoxide, rare earth oxides, rare earth salts and transition metal salts, organometallics, amines, guanidines and the like.

Advantageously, the catalyst of the present esterification reaction is in liquid form at room temperature.

Preferably the catalyst of the present esterification reaction is a tin or a titanium catalyst. Examples of catalyst preferred according to the invention are: organotin oxides, hydroxides, and alkoxides (such as dibutyltin oxide, dibutyltin laurate, dibutyltin dilaurate), titanium tetraisopropoxide and mixture thereof.

Preferably, the catalyst is used in an amount within the range of from 0.1 to 3 mol %, based on the total moles of acid present in the reaction mixture, when the asi is used as such, or from 0.1 to 0.8 mol % of triglycerides present in the reaction mixture.

The esterification reaction is carried out at a temperature preferably within the range from 50° C. to 250° C.

Preferably, the esterification reaction is carried out at a pressure within the range from 1 atm to 4 atm.

Preferably, the reaction time is within the range from 2 hours to 48 hours.

Preferably, the esterification reaction is carried out in the absence of any added solvent so as to avoid any contamination of the polymer coating applied on the optical waveguide.

The polyester of the present invention is radiation curable. Radiation includes infrared radiation, thermal radiation (including heat provided in whatever manner including e.g. hot air), ultraviolet radiation, X-rays, electron beams, and the like. Thermal and UV radiation are preferred, the first being more preferred. Other curing method can be applied concurrently with the radiation curing.

According to a first preferred embodiment, the cured polymer material of the coating is obtained by thermally curing the polyester of the present invention by thermal radiation. Thermal curing is preferably carried out at a temperature up to 300° C., more preferably within the range of 80° C. to 300° C. and even more preferably within the range of 120° C. to 300° C.

The curing of the polyester can take place also by crosslinking in the presence of oxygen. Oxygen can behave as crosslinking initiator or adjuster. The desired final properties of the cured polymer can be adjusted also by varying both the curing temperature and the curing time, as these two parameters influence the crosslinking density of the curing reaction and thus the degree of crosslinking of the polymer.

Optionally, curing of the polyester can be done in the presence of a thermal free radical initiator. A cationic initiator can be concurrently employed.

Preferably, thermal initiators having an activation temperature within the range of from 60° C. to 300° C. are used. Examples of thermal initiators that can be used for the purpose of the present invention are: 2,2'-azobis(2-methyl-propio-nitrile), meso-1,2-dibromo-1,2-diphenylethane, tretraalkyl-1,2-diphenylethanes.

Examples of cationic initiators that can be used for the purpose of the present invention are iodonium derivatives.

When a thermal initiator is used, a thermocurable composition comprising a polyester and a thermal initiator is prepared, wherein said initiator is preferably present in an amount of from 0.3 wt % to 8 wt %, more preferably from 0.5 wt % to 5 wt %, based on the weight of the thermocurable composition.

According to a second preferred embodiment, the cured polymer material of the coating is obtained by UV-curing the polyester of the present invention, particularly in the presence of a photoinitiator. Conventional photoinitiators can be used in the present invention. Examples of suitable photinitiators include benzophenone- and/or acetophenone derivatives, such as alpha-hydroxy alkylphenyl ketones, benzoin alkyl ethers and benzil ketals, monoacylphosphine oxides, and bisacylphosphine oxides. Preferred photoinitiators are 1-hydroxycyclohexyl phenyl ketone, 2-hydroxy-2-methyl-1-phenyl-propan-1-one, and diphenyl(2,4,6-trimethylbenzoyl) phosphine oxide.

When a photoinitiator is used, a UV-curable composition comprising a polyester and a photoinitiator is prepared, wherein said photoinitiator is present in an amount of from 0.3 wt % to 8 wt %, more preferably from 0.5 wt % to 5 wt %, based on the weight of the radiation curable composition.

The radiation curable coating compositions of the present invention (hereinafter referred to also as curable compositions) can also include other conventional additives in effective amounts. For example, additives such as stabilizers, levelling agents, adhesion promoters chain transfer agents, colorants including pigments and dyes, viscosity adjusters, wettability adjusters, adhesion promoters and the like can be used.

The curable composition of the present invention can be prepared by mixing the components with any suitable method known in the art.

After curing, the polymers obtained have mechanical properties, elasticity and adhesion properties which make them suitable as coating layers for optical fibres. Particularly, the cured polymer materials of the present invention have modulus of elasticity (E') and glass transition temperature which fulfill the requirements for use as primary coating layers, secondary coating layers or single coating layers. Preferably, the coating materials of the present invention are used as primary coating layers and single coating layers.

When used as primary coating layer, the cured polymer material of the present invention preferably has a modulus of elasticity (E') at 25° C. of from 0.01 to 5 MPa, more preferably of from 0.05 to 5 MPa, and a glass transition temperature (Tg) of −20° C. at most, preferably of −30° C. at most. When used as single coating layer, the cured polymer material of the present invention preferably has a modulus of elasticity (E') at 25° C. of from 20 to 100 MPa, more preferably of from 30 to 80 MPa, and a glass transition temperature (Tg) of 20° C. at most, preferably of 0° C. at most.

When used as secondary coating layer, the cured polymer material of the present invention preferably has a modulus of elasticity (E') at 25° C. of from 500 to 2000 MPa, and a glass transition temperature (Tg) greater than 50° C.

When the polyester of the present invention is used to form a primary coating on an optical fibre, a secondary coating surrounding said primary coating can also be applied using the polymer materials conventionally used in the art for the manufacturing of secondary coatings, for example a UV curable acrylate secondary coating.

A secondary coating usable in the fibre of the present invention in combination with a thermally curable primary coating can comprise a polymer selected from: methacrylate polymer, acrylate polymer and mixtures thereof. In particular, the secondary coating comprises urethane acrylate polymers which can be obtained, for instance, by radiation curing a radiation curable composition comprising an oligomer having a backbone derived from polypropylenglycol and a dimer acid based polyester polyol. A material suitable for the secondary coating of the optical fibre of the invention is disclosed in WO2012036546 or is marketed by DeSolite® 3471-2-136.

The manufacturing of the coated optical fibre according to the present invention can be carried out according to known techniques. For example, after drawing of the optical waveguide a primary coating can be applied by passing the optical waveguide through a sizing die and a reservoir containing the curable composition according to the present invention. When a thermally curable composition is used, the application can advantageously be done when the optical waveguide has a suitable temperature, e.g. from 150° C. to 300° C., so as to exploit the heat of the drawn optical waveguide to obtain the final cured polymer material. When a radiation curable polymer or composition is applied, the application step is followed by radiation curing (e.g. by UV or IR) of the applied composition so as to obtain the final polymer material. In the case of deposition of both a primary and a secondary coating, the latter is applied on the primary coating before or after the curing of the secondary coating (by techniques known as wet-on-dry or wet-on-wet deposition).

An optical fibre thus produced may be used in the production of optical cables. The fibre may be used either as such or in the form of ribbons comprising several fibres combined together by means of a common coating.

The present description shows only some embodiments of a coated optical fibre according to the invention. Suitable modifications can be made to these embodiments according to specific technical needs and application requirements without departing from the scope of the invention.

The following examples are provided to further illustrate the invention.

EXAMPLES

Synthesis of the Polyester Polymer

Polyester polymers according to the present invention were prepared using the following procedure. A reaction mixture was prepared by mixing at ambient temperature (25° C.) a triglyceride, a polyol and a transesterification catalyst. The reaction mixture was heated and allowed to react for a given time. Comparative samples (marked by an asterisk * in the table) were also prepared using the same procedure. The chemical composition of the reaction mixture and the transesterification reaction conditions (curing temperature and curing time) used for each sample are reported in Table 1.

TABLE 1

| Sample no. | Reactants Oil (mol of triglycerides) | Polyol (mol) | Catalyst (mol %$^a$) | Reaction conditions Temperature (° C.) | Reaction time (hours) |
|---|---|---|---|---|---|
| 1 | Tung oil (1.0) | Dipentaerythritol (1.5) | DBTO (0.4) | 150 | 8 |
| 2 | Tung oil (1.0) | TMPE 170 (1.0) | DBTO (0.4) | 150 | 12 |
| 3 | Tung oil (1.0) | TMPE 170 (2.0) | DBTO (0.4) | 150 | 12 |
| 4 | Tung oil (1.0) | TMPE 450 (2.0) | DBTO (0.4) | 150 | 24 |
| 5 | Tung oil (1.0) | TMPE 1014 (2.0) | DBTO (0.4) | 150 | 48 |
| 6 | Tung oil (1.0) | TMPE 170 (2.0) | DBTL (0.15) | 150 | 16 |
| 7 | Tung oil (1.0) | TMPE 450 (2.0) | DBTL (0.15) | 150 | 24 |
| 8 | Tung oil (1.0) | TMPE 170 (2.0) | DBTL (0.4) | 150 | 12 |
| 9 | Tung oil (1.0) | TMPE 170 (1.0) | DBTL (0.4) | 150 | 12 |
| 10* | Tung oil (1.0) | Glycerol (6.5) | DBTO (0.14) | 150 | 8 |
| 11* | Olive oil (1.0) | Dipentaerythritol (1.5) | DBTO (0.4) | 150 | 8 |
| 12* | Linseed oil (1.0) | Dipentaerythritol (1.5) | DBTO (0.4) | 150 | 8 |
| 13 | Tung oil (1.0) | P[TMPdiPG]-AA/PA] (2.0) | DBTL (0.15) | 150 | 24 |

$^a$based on the total moles of the fatty acids present in the triglycerides of the reaction mixture;
Tung oil: α-eleostearic acid 82 wt %, linoleic acid 8 wt %, palmitic acid 5 wt %, oleic acid 5 wt %, weight percentages referred to the weight of the oil;
Linseed oil: α-linolenic acid 55 wt %, oleic acid 20 wt %, linoleic acid 15 wt %, palmitic acid 7 wt %, stearic acid 3 wt %, weight percentages referred to the weight of the oil;
Olive oil: oleic acid 70 wt %, linoleic acid 15 wt %, palmitic acid 13 wt %, stearic acid 1 wt %, weight percentages referred to the weight of the oil;
TMPE 170: Trimethylolpropane ethoxylate (average number molecular weight (Mn) = 170);
TMPE 450: Trimethylolpropane ethoxylate (Mn = 450);
TMPE 1014: Trimethylolpropane ethoxylate (Mn = 1014);
P[TMPdiPG)-AA/PA]: poly[trimethylolpropane/di(propylene)-alt-adipic acid/phthalic anhydride]poly (CAS No. 68133-07-3).
DBTO: dibutyltin (IV) oxide;
DBTL: dibutyltin dilaurate.

Comparative Sample 12 resulted to be too heterogeneous to provide a coating for optical fibres. Without wishing to be bound to such theory, this could be due to the substantial lack of aliphatic chain comprising at least two conjugated double bonds in the linseed oil used as reactant A.

Also comparative Sample 11 resulted to be too heterogeneous to provide a coating for optical fibres, possibly for the same reasons set forth in connection with the failure of comparative Sample 12.

From the above samples 1-9 and comparative sample 10 films have been obtained using an automatic coater with micrometric blade settled in order to obtain film thickness from 50 to 200 microns. The films were thermally cured by heating at a temperature within the range from 220° C. to 280° C. for a curing time within the range from 5 min to 60 min in the absence of any initiator. The temperatures and times provided in Table 2 are an example of suitable curing conditions.

The modulus of elasticity (E') at −30° C., +25° C. and +100° C. and the glass transition temperature of each of the cured film as determined by means of DMTA analysis are compiled in Table 2. Comparative results obtained on films of commercial primary coating C1 (DP1014-XS by DSM) and single coating SC (3471-3-14 by DSM) compositions are also reported in Table 2. The curing conditions for the reference coating were as indicated by the supplier.

TABLE 2

| Sample no. | Curing conditions (° C. - min) | E' (MPa) −30° C. | E' (MPa) +25° C. | E' (MPa) +100° C. | Tg (° C.) on-set point |
|---|---|---|---|---|---|
| 1 | 230° C. - 5 min | 1176 | 41.8 | 4.67 | −10.5 |
| 2 | 270° C. - 30 min | 584.9 | 2.323 | 2.315 | −34.92 |
| 3 | 270° C. - 30 min | 66.65 | 0.6478 | 0.7707 | −39.67 |
| 4 | 270° C. - 45 min | 0.6336 | 0.0712 | 0.08009 | −51.18 |
| 5 | 280° C. - 60 min | 1.676 | | | −51.39 |
| 6 | 270° C. - 30 min | 115.11 | 0.3291 | 0.3498 | −42.30 |
| 8 | 270° C. - 30 min | 74.08 | 0.2272 | 0.2727 | — |
| 9 | 270° C. - 30 min | 191.6 | 1.213 | 1.649 | — |
| 10* | 230 °C. - 5 min | — | — | — | — |
| C1 | — | 33.33 | 0.882 | 1.12 | −46.7 |
| SC | — | 1300 | 200 | <3 | 5 |

As shown by the above results, the cured polymers based on the polyester derivatives of the present invention have adequate mechanical properties for use as primary coating and single layer coatings for optical fibres.

Comparative Sample 10 partially degraded under cross-linking conditions even when lower cross-linking temperatures were employed. Without wishing to be bound to such theory, this could be due to the fact that glycerol is thermally unstable below 300° C. In particular, glycerol has a weight loss greater than 2 wt % at a temperature of about 200° C.

The invention claimed is:

1. An optical fibre comprising:
an optical waveguide comprising a glass core surrounded by a glass cladding;
a coating surrounding said optical waveguide comprising a cured polymer material obtained by esterification or transesterification of: a reactant A selected from an acid, a triglyceride, or a mixture of triglycerides having a $C_1$-$C_{24}$ aliphatic chain comprising at least two conjugated double bonds; and a polyol reactant B comprising at least 3 hydroxyl groups, and crosslinking the esterification or transesterification product to obtain the cured polymer material;
wherein
the polyol reactant B is stable to decomposition weight loss up to at least 300° C.,
the cured polymer material comprises a crosslinked polyester of a $C_6$-$C_{24}$ carboxylic acid having an aliphatic chain comprising at least two conjugated double bonds and the polyol reactant B.

2. The optical fibre according to claim 1, wherein said cured polymer material is a thermally cured polymer material crosslinked by thermal radiation.

3. The optical fibre according to claim 1, wherein the reactant A is an acid which is a monocarboxylic acid.

4. The optical fibre according to claim 1, wherein the reactant A is an acid which is selected from the group consisting of alpha-eleostearic acid, calendic acid, punicic acid and licanic acid.

5. The optical fibre according to claim 1, wherein the reactant A is a mixture of triglycerides and comprises at least 70 wt %, based on the total weight of said mixture, of $C_{16}$-$C_{24}$ aliphatic chains comprising at least two conjugated double bonds.

6. The optical fibre according to claim 1, wherein the polyol reactant B comprises from 3 to 9 hydroxyl groups.

7. The optical fibre according to claim 1, wherein the hydroxyl groups of the polyol reactant B are primary hydroxyl groups.

8. The optical fibre according to claim 1, wherein said polyol reactant B is selected from the group consisting of glycerol ethoxylate, glycerol propoxylate, trimethylolpropane ethoxylate, dipentaerythritol and mixtures thereof.

9. The optical fibre according to claim 1, wherein the esterification or transesterification is carried out in the presence of a catalyst selected from tin or titanium catalyst.

10. An optical fibre according to claim 1, wherein said coating is selected from: primary coating and single coating.

11. An optical fibre according to claim 1, wherein said coating is a primary coating which is surrounded by a secondary coating, said secondary coating.

12. Method for coating an optical fibre comprising:
providing an optical waveguide comprising a glass core surrounded by a glass cladding;
applying a radiation curable coating composition on the cladding, said coating composition comprising a product of an esterification or transesterification reaction of: a reactant A selected from an acid, a triglyceride, or a mixture of triglycerides having a $C_{16}$-$C_{24}$ aliphatic chain comprising at least two conjugated double bonds, and a polyol reactant B comprising at least 3 hydroxyl groups, the polyol reactant B being thermally stable to decomposition weight loss up to at least 300° C., the esterification or transesterification reaction being carried out in the presence of a catalyst;
curing said radiation curable coating composition so as to crosslink said product and to form the coating; wherein the cured coating composition comprises a crosslinked polyester of a $C_{16}$-$C_{24}$ carboxylic acid having an aliphatic chain comprising at least two conjugated double bonds and the polyol reactant B.

13. Method for coating an optical fibre according to claim 12, wherein reactant A is an acid having at least one $C_{16}$-$C_{24}$ aliphatic chain comprising at least two conjugated double bonds, and the ratio between reactant A and reactant B is of one mole of reactant A per each hydroxyl group comprised in the reactant B.

14. Method for coating an optical fibre according to claim 12, wherein reactant A is a triglyceride or mixture of triglycerides containing at least one $C_{16}$-$C_{24}$ aliphatic chain comprising at least two conjugated double bonds, and the reactant A is made to react with reactant B in a molar ratio A/B within the range from 1:1 to 1:3, wherein A is expressed as number of moles of triglycerides having at least one chain comprising at least two conjugated double bonds and B is expressed as number of moles of polyol.

15. Polymer material comprising a polyester obtained by crosslinking a product of an esterification or transesterification reaction of a reactant A selected from an acid, a triglyceride, or a mixture of triglycerides having a $C_{16}$-$C_{24}$ aliphatic chain comprising at least two conjugated double bonds, and a polyol made of at least one monomer thermally stable to decomposition weight loss up to at least 300° C. and comprising at least 3 hydroxyl groups (reactant B), the esterification or transesterification reaction being carried out in the presence of a catalyst: wherein the polymer material comprises a crosslinked polyester of a $C_{16}$-$C_{24}$ carboxylic acid having an aliphatic chain comprising at least two conjugated double bonds and the polyol reactant B.

16. Method for obtaining predetermined mechanical properties of a coating for an optical fibre, wherein the coating comprises a cured polymer material comprising a polyester obtained by crosslinking a product of an esterification or transesterification reaction of:
a reactant A selected from an acid, a triglyceride, or a mixture of triglycerides having a $C_{16}$-$C_{24}$ aliphatic chain comprising at least two conjugated double bonds, and
a reactant B made of a polyol comprising at least 3 hydroxyl groups, the polyol being thermally stable to decomposition weight loss up to at least 300° C.,
wherein the cured coating composition comprises a crosslinked polyester of a $C_{16}$-$C_{24}$ carboxylic acid having an aliphatic chain comprising at least two conjugated double bonds and the polyol reactant B, and
wherein the mechanical properties are adjusted by selecting a ratio between reactant A and reactant B.

* * * * *